US008894055B2

(12) United States Patent
Marrinan et al.

(10) Patent No.: US 8,894,055 B2
(45) Date of Patent: Nov. 25, 2014

(54) TENSIONER FOR HOLDING AN ELONGATED WORKPIECE

(75) Inventors: Thomas E. Marrinan, Minneapolis, MN (US); Wesley J. Rieckenberg, Forest Lake, MN (US); James R. Cunov, Dellwood, MN (US)

(73) Assignee: PaR Systems, Inc., Shoreview, MN (US)

( * ) Notice: Subject to any disclaimer, the term of this patent is extended or adjusted under 35 U.S.C. 154(b) by 992 days.

(21) Appl. No.: 12/696,223

(22) Filed: Jan. 29, 2010

(65) Prior Publication Data
US 2010/0187737 A1 Jul. 29, 2010

Related U.S. Application Data

(60) Provisional application No. 61/148,261, filed on Jan. 29, 2009.

(51) Int. Cl.
*B23Q 1/64* (2006.01)
*B25B 1/02* (2006.01)
*B23Q 1/03* (2006.01)
*B23Q 3/06* (2006.01)
*B23Q 3/16* (2006.01)

(52) U.S. Cl.
CPC ............... *B23Q 3/062* (2013.01); *B23Q 1/037* (2013.01); *B23Q 3/16* (2013.01)
USPC ........................................... 269/56; 269/140

(58) Field of Classification Search
USPC ............ 269/56, 140, 37, 55; 29/897.32, 560, 29/560.1; 26/51
See application file for complete search history.

(56) References Cited

U.S. PATENT DOCUMENTS 5,379,510 A 1/1995 Berge
8,376,730 B2 * 2/2013 Abeta et al. ............... 425/397

FOREIGN PATENT DOCUMENTS

CN 201186355 1/2009
(Continued)

OTHER PUBLICATIONS

Official Search Report of the European Patent Office in counterpart foreign application No. PCT/US2010/022483 filed Jan. 29, 2010.

(Continued)

*Primary Examiner* — Lee D Wilson
*Assistant Examiner* — Jamal Daniel
(74) *Attorney, Agent, or Firm* — Steven M. Koehler; Westman, Champlin & Koehler, P.A.

(57) ABSTRACT

A support assembly and a method for holding an elongated workpiece are provided. First and second tensioning assemblies are spaced apart from each other along a longitudinal axis. Each tensioning assembly has a fixture element adapted to hold a portion of the workpiece and a tension actuator operably coupled to the fixture element to move the fixture element. First and second clamp devices are disposed along the longitudinal axis where the first clamp device is disposed on a first side of the longitudinal axis and the second lateral clamp device is disposed on a second side of the longitudinal axis. Each lateral clamp device has an end portion configured to hold a portion of the workpiece and restrain the workpiece for twisting and/or lateral movement of the workpiece orthogonal to the longitudinal axis and a clamp actuator operably coupled to the end portion to move the end portion.

19 Claims, 8 Drawing Sheets

(56) References Cited

FOREIGN PATENT DOCUMENTS

| | | | |
|---|---|---|---|
| EP | 0036376 | | 9/1981 |
| JP | 5583513 | | 5/1980 |
| JP | 2007175823 | | 7/2007 |
| JP | 2007274678 A | * | 10/2007 |
| WO | WO 89/05709 | | 6/1989 |
| WO | WO 92/12816 | | 8/1992 |

OTHER PUBLICATIONS

Written Opinion of the European Patent Office in counterpart foreign application No. PCT/US2010/022483 filed Jan. 29, 2010.

State Intellectual Property Office of People's Republic of China, First Office Action, Issuing Date Mar. 12, 2013.

State Intellectual Property Office of People's Republic of China, Application No. 201080005572.9, issued Apr. 22, 2014, the 3rd Office Action.

* cited by examiner

TENSIONER FOR HOLDING AN ELONGATED WORKPIECE

CROSS-REFERENCE TO RELATED APPLICATION

This application claims the benefit of U.S. Provisional Application entitled "TENSIONER FOR HOLDING AN ELONGATED WORKPIECE" having Ser. No. 61/148,261 filed Jan. 29, 2009, the content of which is also incorporated herein by reference in its entirety.

BACKGROUND

The discussion below is merely provided for general background information and is not intended to be used as an aid in determining the scope of the claimed subject matter.

Support assemblies for workpieces are generally known. However, precision machining, inspection or performing other operations on an elongated workpiece is particularly difficult. In many instances, the elongated workpiece is not rigid enough when suspended from its ends and therefore is susceptible to lateral and/or twisting movements. Although various fixtures can be used to control such movement and restrain the elongated workpiece, such fixtures often are in the way with performing work on the workpiece.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

In one embodiment, a support assembly for holding an elongated workpiece includes first and second tensioning assemblies spaced apart from each other along a longitudinal axis. Each tensioning assembly has a fixture element adapted to hold a portion of the workpiece and a tension actuator operably coupled to the fixture element to move the fixture element. First and second clamp devices are disposed along the longitudinal axis where the first clamp device is disposed on a first side of the longitudinal axis and the second lateral clamp device is disposed on a second side of the longitudinal axis. Each lateral clamp device has an end portion configured to hold a portion of the workpiece and restrain the workpiece for twisting and/or lateral movement of the workpiece orthogonal to the longitudinal axis and a clamp actuator operably coupled to the end portion to move the end portion. In one embodiment, support assembly further includes a system controller operably coupled to each of the tensioning assemblies to operate the tension actuators and operably coupled to each of the lateral clamp devices to operate the clamp actuators.

In another embodiment, a support assembly for holding an elongated workpiece includes a first tensioning assembly and a second tensioning assembly spaced apart from the first tensioning assembly along a longitudinal axis. Each tensioning assembly has a fixture element adapted to hold a portion of the workpiece and a tension actuator operably coupled to the fixture element to move the fixture element. A first plurality of lateral clamp devices is disposed on a first side of the longitudinal axis and a second plurality of lateral clamp devices is disposed on a second side of the longitudinal axis. Each lateral clamp device has an end portion configured to hold a portion of the workpiece and restrain the workpiece for twisting and/or lateral movement of the workpiece orthogonal to the longitudinal axis and a clamp actuator operably coupled to the end portion to move the end portion. A system controller is operably coupled to each of the tensioning assemblies and each of the lateral clamp devices. The system controller is configured to store a selected reference position for each end portion of the first plurality of lateral clamp devices. The system controller is configured to operate each of the actuators of the first plurality of lateral clamp devices so that each end portion thereof obtains its corresponding selected reference position, wherein after operation of the actuators of the first plurality of lateral clamp devices so that each end portion thereof obtains its corresponding selected reference position, the system controller is configured to operate the each of the actuators of the second plurality of lateral clamp devices so that each end portion thereof engages and restrains the workpiece for twisting and/or lateral movement of the workpiece orthogonal to the longitudinal axis.

One or more of the following features can be included in the foregoing embodiments. The system controller can be configured to position the workpiece between the tensioning assemblies by controlling the tension actuators of the first tensioning assembly and the second tensioning assembly in an alternating manner so as to cause alternating movement of each corresponding fixture element away from each other. Such alternating movements can include one or more movements of the fixture element of the first tensioning assembly followed by one or more movements of the fixture element of the second tensioning assembly, or the alternating movements can comprise only one movement of the fixture element of the first tensioning assembly followed by only one movement of the fixture element of the second tensioning assembly.

The system controller can be configured to operate one or more of the first lateral clamp devices so as to displace the end portion thereof to a selected position. In one embodiment, the system controller is configured to operate one or more of the second lateral clamp devices, after the first lateral clamp device(s) has been operated to displace the end portion thereof to the selected position, in order to restrain the workpiece. The system controller can be configured to store a position of the end portion of the second lateral clamp device(s) after the first lateral clamp device(s) has been operated to displace the end portion thereof to the selected position.

The system controller can be configured to move one of the lateral clamp devices away from the workpiece when needed to access the workpiece proximate the end portion of said one of the lateral clamp devices and then return the end portion of said one of the lateral clamp devices to engage the workpiece when access to the workpiece proximate the end portion of said one of the lateral clamp devices is no longer needed.

Methods of supporting a workpiece are also provided. A first method includes: providing a support assembly having a first tensioning assembly and a second tensioning assembly spaced apart from the first tensioning assembly along a longitudinal axis, each tensioning assembly having a fixture element adapted to hold a portion of the workpiece and a tension actuator operably coupled to the fixture element to move the fixture element, and a first lateral clamp device disposed on a first side of the longitudinal axis and a second lateral clamp device disposed on a second side of the longitudinal axis, each lateral clamp device having an end portion configured to hold a portion of the workpiece and restrain the workpiece for twisting and/or lateral movement of the workpiece orthogonal to the longitudinal axis and a clamp actuator operably coupled to the end portion to move the end portion; mounting the workpiece on the support assembly with a first portion coupled to the fixture element of the first tensioning assembly and a second portion coupled to the fixture element of the second tensioning assembly; operating the actuators of the tensioning assemblies to move the fixture elements away from each other to impart tension in the workpiece; and operating the lateral clamp devices to engage the workpiece and restrain the workpiece for twisting and/or lateral movement of the workpiece orthogonal to the longitudinal axis.

A second method for holding a workpiece includes: providing a support assembly having a first tensioning assembly and a second tensioning assembly spaced apart from the first tensioning assembly along a longitudinal axis, each tensioning assembly having a fixture element adapted to hold a portion of the workpiece and a tension actuator operably coupled to the fixture element to move the fixture element, and a first lateral clamp device disposed on a first side of the longitudinal axis and a second lateral clamp device disposed on a second side of the longitudinal axis, each lateral clamp device having an end portion configured to hold a portion of the workpiece and restrain the workpiece for twisting and/or lateral movement of the workpiece orthogonal to the longitudinal axis and a clamp actuator operably coupled to the end portion to move the end portion; mounting the workpiece on the support assembly with a first portion coupled to the fixture element of the first tensioning assembly and a second portion coupled to the fixture element of the second tensioning assembly; operating the actuators of the tensioning assemblies to move the fixture elements away from each other to impart tension in the workpiece, and then operating each of the actuators of the first plurality of lateral clamp devices so that each end portion thereof obtains a selected reference position, and then operating each of the actuators of the second plurality of lateral clamp devices so that each end portion thereof engages and restrains the workpiece for twisting and/or lateral movement of the workpiece orthogonal to the longitudinal axis.

One or more of the following features can be used in the foregoing methods. Operating the actuators of the tension assemblies can comprise controlling the tension actuators of the first tensioning assembly and the second tensioning assembly in an alternating manner so as to cause alternating movement of each corresponding fixture element away from each other. The alternating movements of each corresponding fixture element can comprise one or more movements of the fixture element of the first tensioning assembly followed by one or more movements of the fixture element of the second tensioning assembly, or can comprise only one movement of the fixture element of the first tensioning assembly followed by only one movement of the fixture element of the second tensioning assembly.

If desired, positions of the end portions of each of the second lateral clamp devices can be stored after the first lateral clamp device(s) has been operated to displace the end portion thereof to the selected position. The methods can also include moving one of the lateral clamp devices away from the workpiece when needed to access the workpiece proximate the end portion of said one of the lateral clamp devices and then return the end portion of said one of the lateral clamp devices to engage the workpiece when access to the workpiece proximate the end portion of said one of the lateral clamp devices is no longer needed.

DETAILED DESCRIPTION OF THE ILLUSTRATIVE EMBODIMENTS

Figure 1:
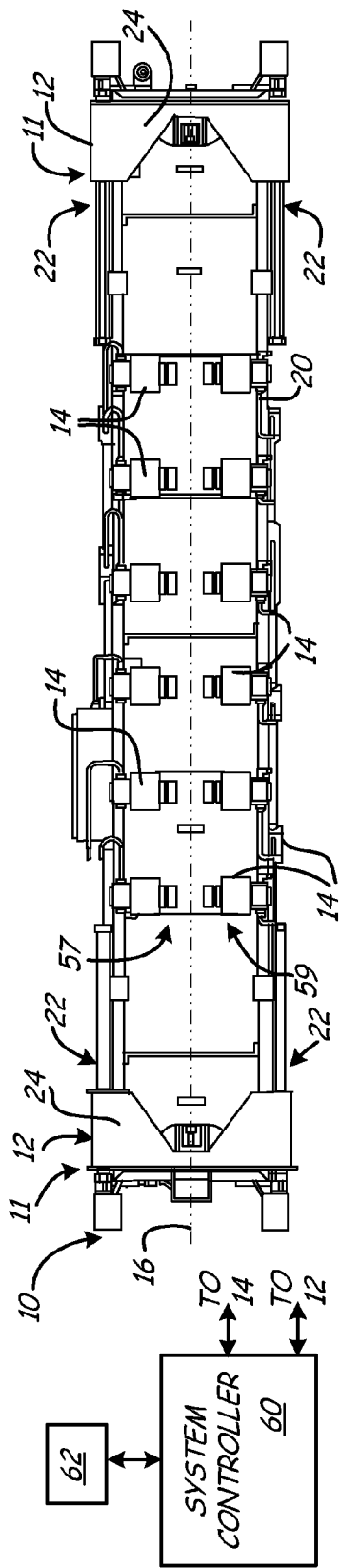
FIG. 1 is a top plan view of a support assembly for holding an elongated workpiece with portions illustrated schematically.

FIGS. 1-4 illustrate an exemplary embodiment of a support assembly 10 for holding an elongated workpiece (not shown) in tension. The support assembly 10 generally includes tensioning assemblies 11 having at least one tensioning actuator 12, spaced apart and opposing each other and one or more pairs of lateral clamp devices 14 disposed between the tensioning assemblies 11 and on opposite sides of a longitudinal axis 16 extending between the tensioning assemblies 11. The tensioning assemblies 11 hold the elongated workpiece at spaced apart locations, for example at remote ends thereof, along the longitudinal axis 16. The lateral clamp devices 14 engage the workpiece on opposite sides thereof at one or more space apart locations along the longitudinal axis 16 to obtain proper orientation of the workpiece.

In the exemplary embodiment, the support assembly 10 further includes a tank 20 for holding a fluid such as water in which the workpiece is held during machine operations. Accordingly, ends of the tensioning assemblies 11 as well as the lateral clamp devices 14 are disposed in the fluid. A workpiece engaging system schematically illustrated at 62 can inspect or otherwise perform work on the workpiece. Typically, the system 62 would include a computer controlled positioning device such as a gantry or other type of robot having one or more end effectors that perform work on the workpiece. Such positioning devices and workpiece engaging systems in general are well known in the art and need not be further described for purposes of the present invention.

In the embodiment illustrated, the tensioning actuators 12 are disposed above the fluid, being coupled to or supported proximate to the tank 20. The tensioning actuators 12 can take many forms and use single or multiple actuators in each assembly. Hydraulic, pneumatic and/or electric actuators, for example, double acting piston/cylinder actuators, linear rotor/stator actuators, or mechanical screw drive actuators are but a few that can be used. Referring also to FIGS. 5-9, in the embodiment illustrated, each tensioning actuator 12 includes two actuators 22 for moving a crosshead 24. The crosshead 24 is coupled to a screw driven linear drive having a rotary actuator 26 (e.g. electric motor) at each and thereof. Each crosshead 24 supports a suitable fixture element or grip 25 to hold an end of the elongated workpiece, the details of which are not necessary for purposes of the present invention and will vary depending upon the configuration of the elongated workpiece. Typically, opposed portions of the fixture elements or grips 25 define the longitudinal axis 16.

The screw driven linear drives operate in unison to displace the crosshead 24, and thus the fixture elements or grips 25, typically along the longitudinal axis 16 based on commands from a system controller 60. Various forms of sensing devices such as linear displacement sensors or rotary sensors can be coupled to the crosshead 24 and/or the linear drives to measure or provide a signal corresponding to displacement and/or position of the corresponding crosshead 24, the signal(s) of which can be provided to the system controller 60.

FIGS. 10 to 16 illustrate an exemplary embodiment of one clamp device of the pair of lateral clamp devices 14. In general, the clamp device 14 includes a piston 30 movable relative to a clamp base 32. The piston 30 supports extension fingers 34 (herein end portions of each clamp device 14) that are configured to selectively engage and align a portion of the workpiece. As indicated above, the clamp devices 14 can be arranged in opposed pairs such that when the workpiece is engaged by fingers 34 of each clamp device 14, the workpiece is held in a stationary rigid position, particularly with respect to proper orientation with respect to the longitudinal axis 16. In other words, the clamp devices 14 restrain the workpiece for lateral movement (orthogonal to the longitudinal axis 16) of the workpiece as well as twisting movement of the workpiece, where all twisting movements can be considered twisting about or referenced to the longitudinal axis 16.

The piston 30 is displaced relative to the clamp base 32 with a suitable actuator 38. Hydraulic, pneumatic and/or electric actuators, for example, double acting piston/cylinder actuators, linear rotor/stator actuators, or mechanical screw drive actuators are but a few that can be used. In the embodiment illustrated, the actuator 38 comprises a screw driven actuator having a rod assembly 40 coupled to the piston 30 and an electric stepper motor 42. An end 45 of the actuator rod is joined to the piston 30 with suitable fasteners 47. The fingers 34 are joined to a mounting plate 49 that in turn is fastened to the piston 30. Seals are provided as necessary to keep fluid out of the internal portions of the piston 30. A servo drive 43 receives command signals from the system controller 60 and controls operation of the stepper motor 42.

Various forms of sensing devices such as linear displacement sensors or rotary sensors can be coupled to the piston and/or the actuator 38 to measure or provide a signal corresponding to displacement and/or position of the piston 30, and thus fingers 34, the signal(s) of which is provided to the system controller 60. In the embodiment illustrated, a proximity sensor 44 measures position of the piston 30 relative to the base 32.

To protect sliding surfaces of the piston 30 and the base 32, a circumferential bellows 46 is provided. A first end 48 of the bellows 46 is connected to the base 32 with a retainer 50, while a second end 52 of the bellows 46 is connected to the piston 30 with a retainer 54. A guard assembly 56 is provided to protect the bellow 46.

In operation, ends of a workpiece are suitably coupled to the fixture elements or grips 25 provided on each of the crossheads 24. In a preferred method of operation, the object of the support assembly 10 is to center, or otherwise locate the workpiece so as to have a known position for machining, inspection, etc. To accomplish positioning of the workpiece, system controller 60 provides command signals to the actuators 12 to increase the distance between the crossheads 24 so as to center the workpiece therebetween and obtain suitable tension in the workpiece as well. In one embodiment with the crossheads 24 in known positions, the system controller 60 alternately commands each of the actuators 22 so as to cause small alternating displacements of the corresponding crossheads 24 and thus fixture elements 25 so as to maintain the centering of the workpiece between the crossheads 24. Typically, alternating movements occurs sequentially and repeatedly where one of the tensioning assemblies is operated to cause only one small movement of the corresponding fixture element, followed directly by operation of the other tensioning assembly so as to cause only one small movement of the corresponding fixture element. However, for purposes of this application "alternating movements" are considered the same or substantially the same amount of displacement of each fixture element to maintain the desired position of the workpiece for at least some of the displacements of the fixture elements, where those skilled in the art can appreciate that at least for some displacements of the fixture elements one or more successive operations of the first tensioning assembly followed by one or more successive operations of the second tensioning assembly may be employed, and thus, such operations are also considered "alternating movements".

When suitable tension has been obtained, or presumed to have been obtained based on displacement, further motion of the crossheads 24 is stopped. Suitable feedback (displacement from displacement sensors and/or tension or force from force sensors in the crossheads and/or actuators 12), or otherwise operably coupled thereto, can be provided back to the system controller 60 during the positioning process. The force sensors can take numerous forms as known in the art such as but not limited to load cells that sense strain in a load body using electrically or optically based sensing devices. Likewise, force can be sensed/ascertained based on operating parameters of the actuators such as but not limited to fluid pressure in hydraulic or pneumatic actuators or current through electric actuators.

Preferably, once the workpiece has been positioned, (e.g. centered), lateral clamp devices 14 are then used to obtain proper orientation of the workpiece about or otherwise with respect to the longitudinal axis 16. Proper orientation can be obtained using the following procedure. Clamp devices 14 on one side of the workpiece (herein identified as 57) are operated by the system controller 60 so as to position the ends of each of the fingers 34 for each of the clamp devices 14 in selected positions corresponding to where the corresponding surface of the workpiece that will be engaged should be located. In effect, one side of the workpiece with respect to the longitudinal axis 16 is considered to have a reference surface and the clamp devices 57 on that side of the workpiece are operated so as to define points on that reference surface that those corresponding portions of that side of the workpiece will be aligned to. It should be noted that during initial positioning of the clamp devices 57 to define the reference points, the workpiece may or may not be engaged by the clamp devices 57 depending upon the orientation of the workpiece after centering, for example, any twisting of the workpiece that may exist. Feedback can be provided back to the system controller 60 during positioning of the clamp devices 57 so as to obtain the desired position of each of the clamp devices in set 57.

With clamp devices 14 on one side of the workpiece positioned as described above and their respective positions stored, the clamp devices 14 on the other side of the workpiece (herein designated as 59) are then actuated by the system controller 60 so as to engage the workpiece from the other side thereby pressing the workpiece against the fingers 34 of the first set of clamp devices 57, which may involve twisting or otherwise displacing the workpiece so that the points on the reference surface of the workpiece are properly positioned. Actuation of each of the clamp devices 59 continues until, for example, a selected clamping force has been individually obtained for each clamping pair of clamp devices 14. At this point, the position of each of the clamp devices of the second set of operated clamp devices 59 can be obtained and stored by system controller 60 so as to know the final position of each of the clamp devices 59. Force sensors can be incorporated into or otherwise operably coupled to the clamp devices 59. The force sensors can take numerous forms as known in the art such as but not limited to load cells that sense strain in a load body using electrically or optically based sensing devices. Likewise, force can be sensed/ascertained based on operating parameters of the actuators such as but not limited to fluid pressure in hydraulic or pneumatic actuators or current through electric actuators.

With the workpiece now properly positioned and held be crossheads 24 and clamp devices 14, machining, inspection or other form of work can begin on the workpiece using the workpiece engaging system 62 where the system 62 interfaces with the system controller 60 as necessary. For instance, if during holding the workpiece, it is necessary to move the fingers 34 away from the workpiece in order due to gain access to the workpiece proximate the fingers 34, the corresponding clamp device 14 can be operated individually by the system controller 60 so as to retract the fingers 34 to a suitable location away from the position of engagement with the workpiece. When access to the workpiece is no longer needed, the system controller 60 can then operate the clamp device 14 to return the fingers 34 thereof to their original location against the workpiece as determined by recorded data for the position of each clamp device 14 either known or ascertained as described above.

Figure 17:
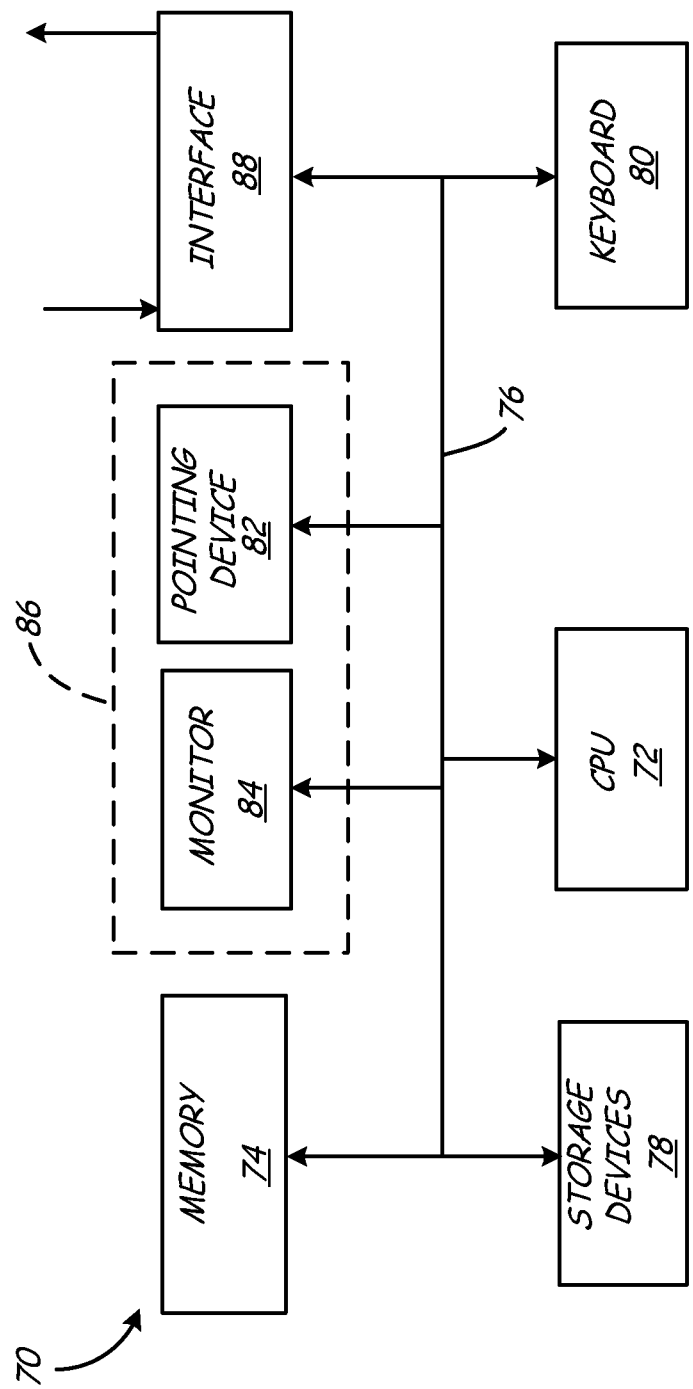
FIG. 17 is a schematic view of a computing environment.

The system controller 60 and/or workpiece engaging system 62 each can be implemented on a digital and/or analog computer. FIG. 17 and the related discussion provide a brief, general description of a suitable computing environment in which the system controller 60 and/or workpiece engaging system 62 may each be implemented. Although not required, the system controller 60 and/or workpiece engaging system 62 can be implemented at least in part, in the general context of computer-executable instructions, such as program modules, being executed by a computer 70. Generally, program modules include routine programs, objects, components, data structures, etc., which perform particular tasks or implement particular abstract data types. Those skilled in the art can implement the description herein as computer-executable instructions storable on a computer readable medium. Moreover, those skilled in the art will appreciate that the invention may be practiced with other computer system configurations, including multi-processor systems, networked personal computers, mini computers, main frame computers, and the like. Aspects of the invention may also be practiced in distributed computing environments where tasks are performed by remote processing devices that are linked through a communications network. In a distributed computer environment, program modules may be located in both local and remote memory storage devices.

The computer 70 illustrated in FIG. 17 comprises a conventional computer having a central processing unit (CPU) 72, memory 74 and a system bus 76, which couples various system components, including memory 74 to the CPU 72. The system bus 76 may be any of several types of bus structures including a memory bus or a memory controller, a peripheral bus, and a local bus using any of a variety of bus architectures. The memory 74 includes read only memory (ROM) and random access memory (RAM). A basic input/output (BIOS) containing the basic routine that helps to transfer information between elements within the computer 70, such as during start-up, is stored in ROM. Storage devices 78, such as a hard disk, a floppy disk drive, an optical disk drive, etc., are coupled to the system bus 76 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 74 from at least one of the storage devices 78 with or without accompanying data.

Figure 2:
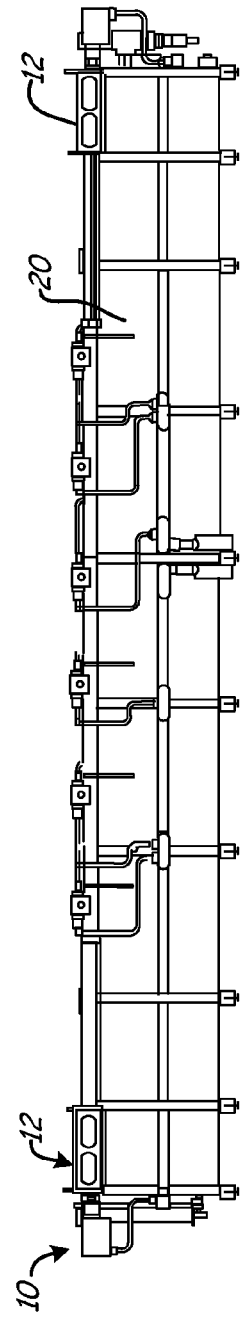
FIG. 2 is a left side elevational view of the support assembly.
Figure 3:
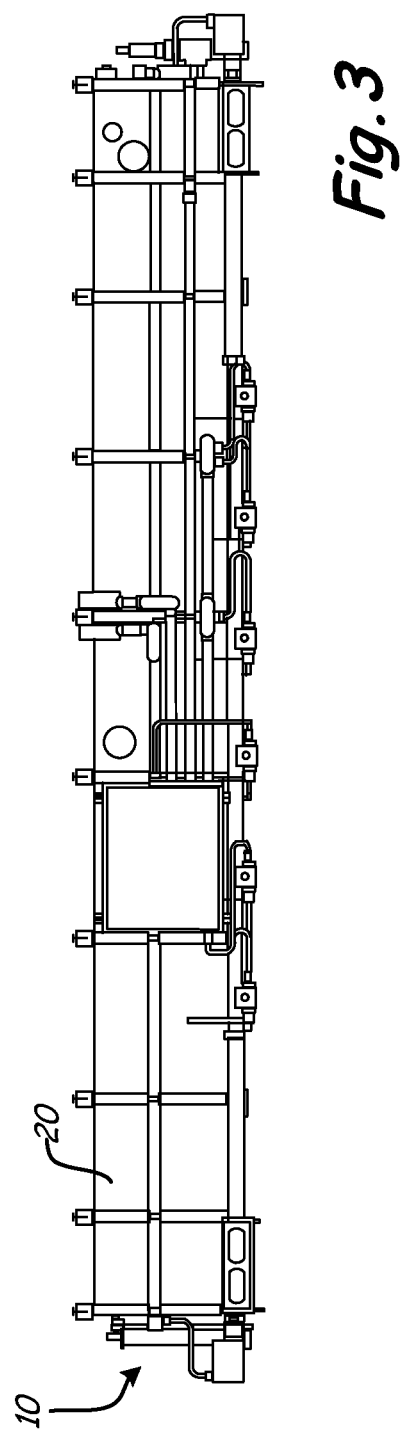
FIG. 3 is a right side elevational view of the support assembly.
Figure 4:
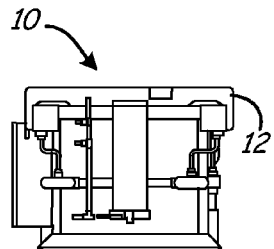
FIG. 4 is an end view of the support assembly.
Figure 5:
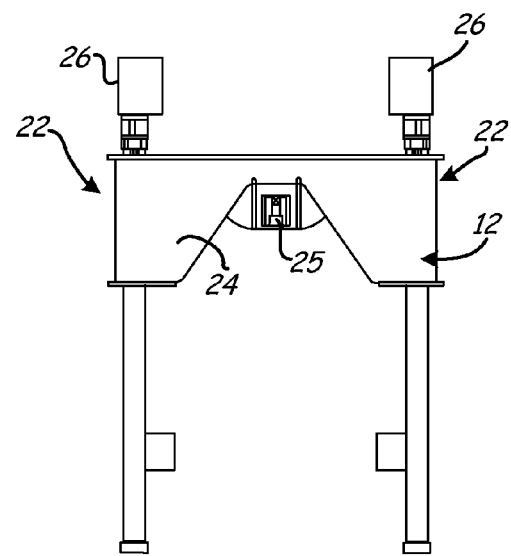
FIG. 5 is a top plan view of a tensioning assembly.
Figure 6:
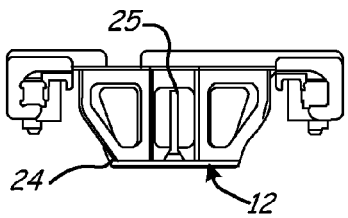
FIG. 6 is an end view of the tensioning assembly.
Figure 7:
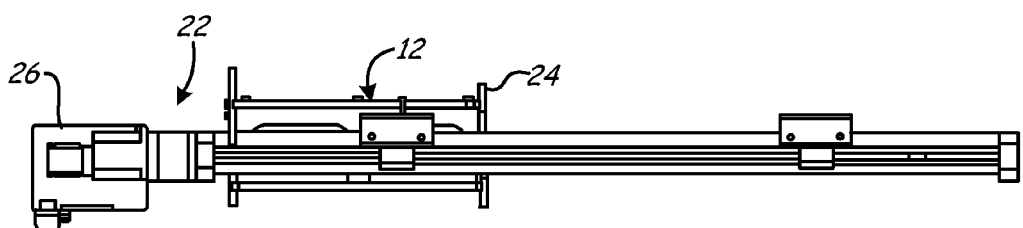
FIG. 7 is a left side elevational view of the tensioning assembly.
Figure 8:
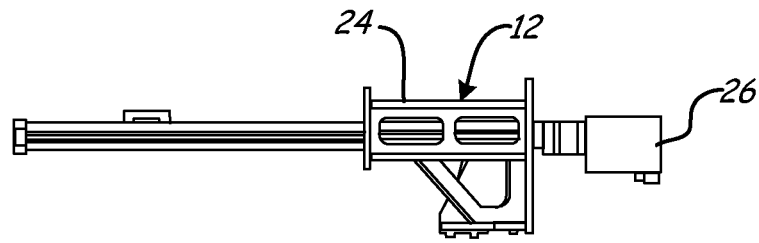
FIG. 8 is a right side elevational view of the tensioning assembly.
Figure 9:
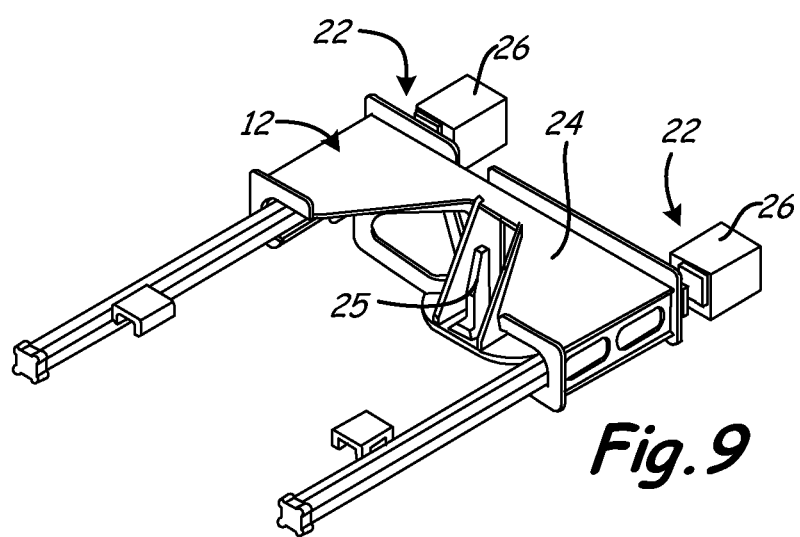
FIG. 9 is a perspective view of the tensioning assembly.
Figure 10:
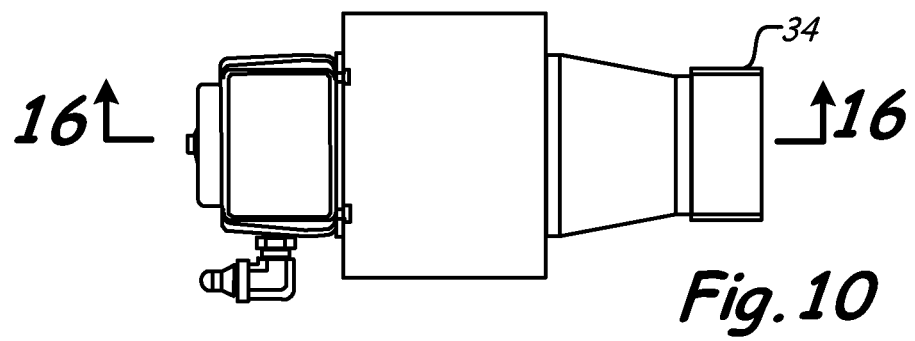
FIG. 10 is a top plan view of a lateral clamp device.
Figure 11:
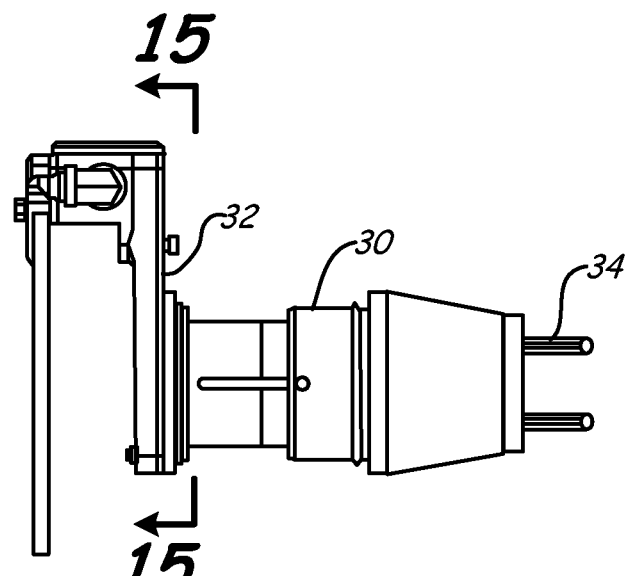
FIG. 11 is a left side elevational view of the lateral clamp device.
Figure 12:
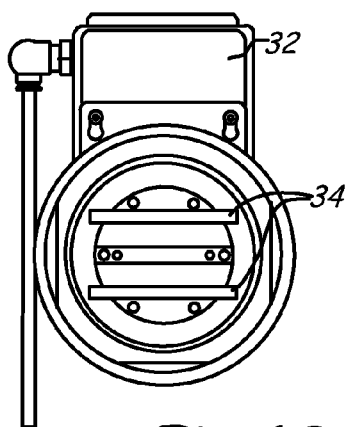
FIG. 12 is a front end view of the lateral clamp device.
Figure 13:
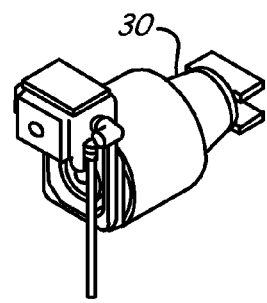
FIG. 13 is a first perspective view of the lateral clamp device.
Figure 14:
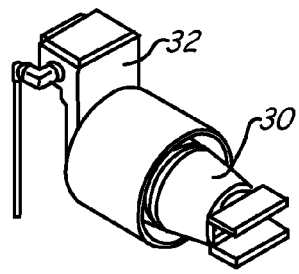
FIG. 14 is a second perspective view of the lateral clamp device.
Figure 15:
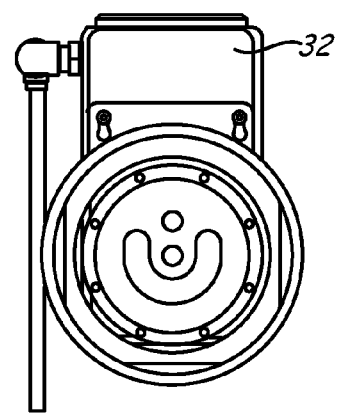
FIG. 15 is a sectional view of the lateral clamp device taken along lines 15-15 in FIG. 11.
Figure 16:
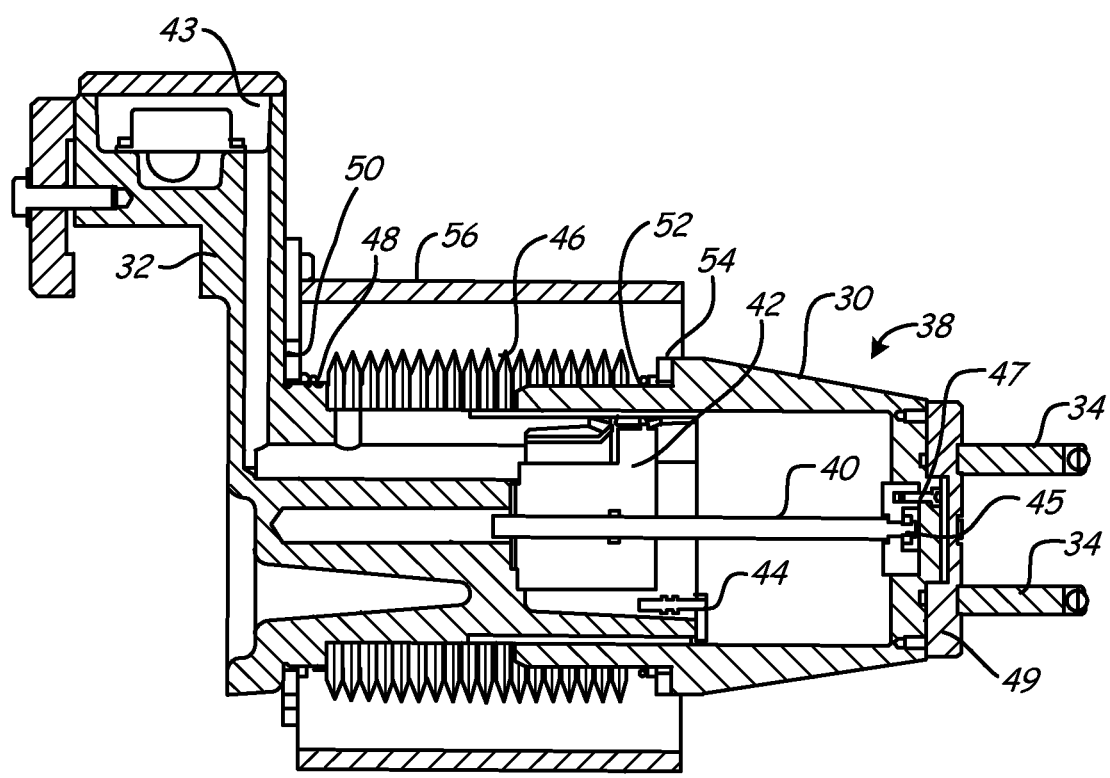
FIG. 16 is a sectional view of the lateral clamp device taken along lines 16-16 in FIG. 10.

Input devices such as a keyboard 80 and/or pointing device (mouse) 82, or the like, allow the user to provide commands to the computer 70. A monitor 84 or other type of output device is further connected to the system bus 76 via a suitable interface and provides feedback to the user. If the monitor 84 is a touch screen, the pointing device 82 can be incorporated therewith. The monitor 84 and typically an input pointing device 82 such as mouse together with corresponding software drivers form a graphical user interface (GUI) 86 for computer 70. Interfaces 88 on each of the system controller 60 and/or workpiece engaging system 62 allow communication between system controller 60 and/or workpiece engaging system 62. Interfaces 88 also represent circuitry used to send signals to or receive signals to the actuators and/or sensing devices mentioned above. Commonly, such circuitry comprises digital-to-analog (D/A) and analog-to-digital (A/D) converters as is well known in the art. Functions of system controller 60 and/or workpiece engaging system 62 can be combined into one computer system. In another computing environment, each of the system controller 60 and/or workpiece engaging system 62 is a single board computer operable on a network bus of another computer, such as a supervisory computer. The schematic diagram of FIG. 2 is intended to generally represent these and other suitable computing environments.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. A support assembly for holding an elongated workpiece comprising:
   a first tensioning assembly and a second tensioning assembly spaced apart from the first tensioning assembly along a longitudinal axis, each tensioning assembly having a fixture element adapted to hold a portion of the workpiece and a tension actuator operably coupled to the fixture element to move the fixture element;
   a first lateral clamp device disposed on a first side of the longitudinal axis and a second lateral clamp device disposed on a second side of the longitudinal axis, each lateral clamp device having an end portion configured to hold a portion of the workpiece and restrain the workpiece for twisting and/or lateral movement of the workpiece orthogonal to the longitudinal axis and a clamp actuator operably coupled to the end portion to move the end portion;

a sensor configured to provide an output signal based on movement of the first tensioning assembly; and a system controller operably coupled to each of the tensioning assemblies to operate the tension actuators and operably coupled to each of the lateral clamp devices to operate the clamp actuators, the system controller being configured to position the workpiece between the tensioning assemblies based on the output signal by controlling the tension actuators of the first tensioning assembly and the second tensioning assembly in an alternating manner so as to cause alternating movement of each corresponding fixture element away from each other.

2. The support assembly of claim 1 wherein the sensor comprises one of a position sensor configured to provide an indication of position based on movement of the first tensioning assembly or a force sensor configured to provide an indication of force based on movement of the first tensioning assembly.

3. A support assembly for holding an elongated workpiece comprising:

a first tensioning assembly and a second tensioning assembly spaced apart from the first tensioning assembly along a longitudinal axis, each tensioning assembly having a fixture element adapted to hold a portion of the workpiece and a tension actuator operably coupled to the fixture element to move the fixture element; and a first plurality of lateral clamp devices disposed on a first side of the longitudinal axis and a second plurality of lateral clamp devices disposed on a second side of the longitudinal axis, each lateral clamp device having an end portion configured to hold a portion of the workpiece and restrain the workpiece for twisting and/or lateral movement of the workpiece orthogonal to the longitudinal axis and a clamp actuator operably coupled to the end portion to move the end portion;

a plurality of sensors, wherein a sensor is configured for each lateral clamp device to provide an output signal based on movement of the associated lateral clamp device; and a system controller operably coupled to each of the tensioning assemblies and each of the lateral clamp devices, the system controller configured to store a selected reference position for each end portion of the first plurality of lateral clamp devices, the system controller configured to operate each of the actuators of the first plurality of lateral clamp devices so that each end portion thereof obtains its corresponding selected reference position based on the output signal from the associated sensor, wherein after operation of the actuators of the first plurality of lateral clamp devices so that each end portion thereof obtains its corresponding selected reference position, the system controller is configured to operate each of the actuators of the second plurality of lateral clamp devices based on the output signal from the associated sensor so that each end portion thereof engages and restrains the workpiece for twisting and/or lateral movement of the workpiece orthogonal to the longitudinal axis.

4. The system of claim 3 and further comprising a tensioning assembly sensor configured to provide a first output signal based on movement of the first tensioning assembly, wherein the system controller is configured to operate the tension actuators based on the first output signal prior to operation of the actuators of the lateral clamp devices so as to cause alternating movement of each corresponding fixture element away from each other.

5. The support assembly of claim 4 wherein the system controller is configured to receive an input signal from a workpiece engaging system and is configured to move one of the lateral clamp devices away from the workpiece when needed based on the input signal to access the workpiece proximate the end portion of said one of the lateral clamp devices and then return the end portion of said one of the lateral clamp devices to engage the workpiece based on the input signal when access to the workpiece proximate the end portion of said one of the lateral clamp devices is no longer needed.

6. The support assembly of claim 5 wherein each sensor for the first plurality of lateral clamp devices comprises a position sensor.

7. The support assembly of claim 5 wherein each sensor for the second plurality of lateral clamp devices comprises a position sensor.

8. The support assembly of claim 5 wherein each sensor comprises one of a position sensor configured to provide an indication of position based on movement of the associated lateral clamp device or a force sensor configured to provide an indication of force based on movement of the associated lateral clamp device.

9. The support assembly of claim 5 wherein the tensioning assembly sensor comprises one of a position sensor configured to provide an indication of position based on movement of the first tensioning assembly or a force sensor configured to provide an indication of force based on movement of the first tensioning assembly.

10. The support assembly of claim 9 wherein alternating movement of each corresponding fixture element away from each other comprises one or more movements of the fixture element of the first tensioning assembly followed by one or more movements of the fixture element of the second tensioning assembly.

11. The support assembly of claim 9 wherein alternating movement of each corresponding fixture element away from each other comprises only one movement of the fixture element of the first tensioning assembly followed by only one movement of the fixture element of the second tensioning assembly.

12. The support assembly of claim 9 wherein the system controller is configured to operate the first lateral clamp device so as to displace the end portion thereof to a selected position.

13. The support assembly of claim 12 wherein the system controller is configured to operate the second lateral clamp device, after the first lateral clamp device has been operated to displace the end portion thereof to the selected position, in order to restrain the workpiece.

14. The support assembly of claim 13 wherein the system controller is configured to store a position of the end portion of the second lateral clamp device after the first lateral clamp device has been operated to displace the end portion thereof to the selected position.

15. The support assembly of claim 14 wherein the first lateral clamp device is one of a plurality of first lateral clamp devices, wherein each of the first lateral clamp devices is disposed on the first side of the longitudinal axis, and wherein the system controller is configured to operate each of the first lateral clamp device so as to displace the end portion thereof each to a corresponding selected position.

16. The support assembly of claim 15 wherein the second lateral clamp device is one of a plurality of second lateral clamp devices, wherein each of the second lateral clamp devices is disposed on the second side of the longitudinal axis, wherein the system controller is configured to operate each of the second lateral clamp devices, after the plurality of first lateral clamp devices have been operated to displace the end portions thereof to their corresponding selected positions, in order to restrain the workpiece against the plurality of first lateral clamp devices.

17. The support assembly of claim 16 wherein the system controller is configured to move one of the lateral clamp devices away from the workpiece when needed to access the workpiece proximate the end portion of said one of the lateral clamp devices and then return the end portion of said one of the lateral clamp devices to engage the workpiece when access to the workpiece proximate the end portion of said one of the lateral clamp devices is no longer needed.

18. The support assembly of claim 16 and further comprising a workpiece engaging system operably coupled to the system controller, the workpiece engaging system having an end effector to perform work upon or inspect a workpiece held by the support assembly, wherein the system controller is configured to receive an input signal from the workpiece engaging system and is configured to move a lateral clamp device from one of the plurality of first lateral clamp devices or the plurality of second lateral clamp devices away from the workpiece when needed based on the input signal such that the end effector accesses the workpiece proximate the end portion of the lateral clamp device and then return the end portion of the lateral clamp device to engage the workpiece based on the input signal when access to the workpiece by the end effector proximate the end portion of the lateral clamp device is no longer needed.

19. The support assembly of claim 4 and further comprising a workpiece engaging system operably coupled to the system controller, the workpiece engaging system having an end effector to perform work upon or inspect a workpiece held by the support assembly, wherein the system controller is configured to receive an input signal from the workpiece engaging system and is configured to move one of the lateral clamp devices away from the workpiece when needed based on the input signal such that the end effector accesses the workpiece proximate the end portion of said one of the lateral clamp devices and then return the end portion of said one of the lateral clamp devices to engage the workpiece based on the input signal when access to the workpiece by the end effector proximate the end portion of said one of the lateral clamp devices is no longer needed.

* * * * *